(12) United States Patent
Lee et al.

(10) Patent No.: US 9,612,113 B2
(45) Date of Patent: Apr. 4, 2017

(54) METHOD AND APPARATUS FOR GENERATING SHAPE INFORMATION OF OBJECT

(71) Applicant: SAMSUNG ELECTRONICS CO., LTD., Suwon-si (KR)

(72) Inventors: Han-sung Lee, Seoul (KR); Kyung-a Kang, Seoul (KR); Chang-soo Lee, Seosan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 722 days.

(21) Appl. No.: 14/015,149

(22) Filed: Aug. 30, 2013

(65) Prior Publication Data
US 2014/0067320 A1     Mar. 6, 2014

(30) Foreign Application Priority Data
Aug. 30, 2012  (KR) .......................... 10-2012-0095956

(51) Int. Cl.
| | |
|---|---|
| G01B 21/00 | (2006.01) |
| G06F 3/03 | (2006.01) |
| G06F 3/041 | (2006.01) |
| G09F 9/30 | (2006.01) |
| G06F 1/16 | (2006.01) |
| G01B 21/20 | (2006.01) |

(52) U.S. Cl.
CPC ............ *G01B 21/20* (2013.01); *G06F 1/1652* (2013.01); *G06F 3/03* (2013.01); *G06F 3/041* (2013.01); *G09F 9/301* (2013.01)

(58) Field of Classification Search
CPC ..................................................... G01B 21/20
See application file for complete search history.

(56) References Cited

U.S. PATENT DOCUMENTS

| | | | |
|---|---|---|---|
| 6,640,202 B1 * | 10/2003 | Dietz ....................... | A41H 1/02 342/118 |
| 7,768,656 B2 | 8/2010 | Lapa et al. | |
| 2006/0238494 A1 * | 10/2006 | Narayanaswami ..... | G06F 3/002 345/156 |

(Continued)

FOREIGN PATENT DOCUMENTS

| | | | | |
|---|---|---|---|---|
| EP | 2357548 A2 | 8/2011 | | |
| SA | WO 2013054202 A1 * | 4/2013 | ........... | A61B 5/1077 |
| WO | 2011078838 A1 | 6/2011 | | |

OTHER PUBLICATIONS

Tarun et al., "Snaplet: Using Body Shape to Inform Function in Mobile Flexible Display Devices" CHI 2011, Interactivity 1 Open, May 7-12, 2011, Vancouver, BC, Canada.*

(Continued)

*Primary Examiner* — Alexander Satanovsky
*Assistant Examiner* — John Kuan
(74) *Attorney, Agent, or Firm* — Sughrue Mion, PLLC

(57) ABSTRACT

A method and an apparatus for generating shape information of an object. The method of generating the shape information of the object includes identifying a bend location of a flexible display apparatus surrounding the object; identifying a bend angle of the flexible display apparatus; and generating the shape information of the object based on the bend location of the flexible display apparatus and the bend angle of the flexible display apparatus.

25 Claims, 11 Drawing Sheets

(56) References Cited

U.S. PATENT DOCUMENTS

| | | | |
|---|---|---|---|
| 2010/0291970 A1* | 11/2010 | Kawakami | G06F 3/0227 455/557 |
| 2011/0057873 A1 | 3/2011 | Geissler et al. | |
| 2011/0261002 A1 | 10/2011 | Verthein | |
| 2012/0032906 A1* | 2/2012 | Lemmens | G06F 3/011 345/173 |
| 2012/0139834 A1 | 6/2012 | Han et al. | |

OTHER PUBLICATIONS

Hoshi et al., "Gravity-Based 3D Shape Measuring Sheet" SICE Annual Conference 2007, Sep. 17-20, 2007, Kagawa University, Japan.*

International Search Report (PCT/ISA/210) dated Dec. 10, 2013 issued by the International Searching Authority in International Application No. PCT/KR2013/007833.

Written Opinion (PCT/ISA/237) dated Dec. 10, 2013 issued by the International Searching Authority in International Application No. PCT/KR2013/007833.

* cited by examiner

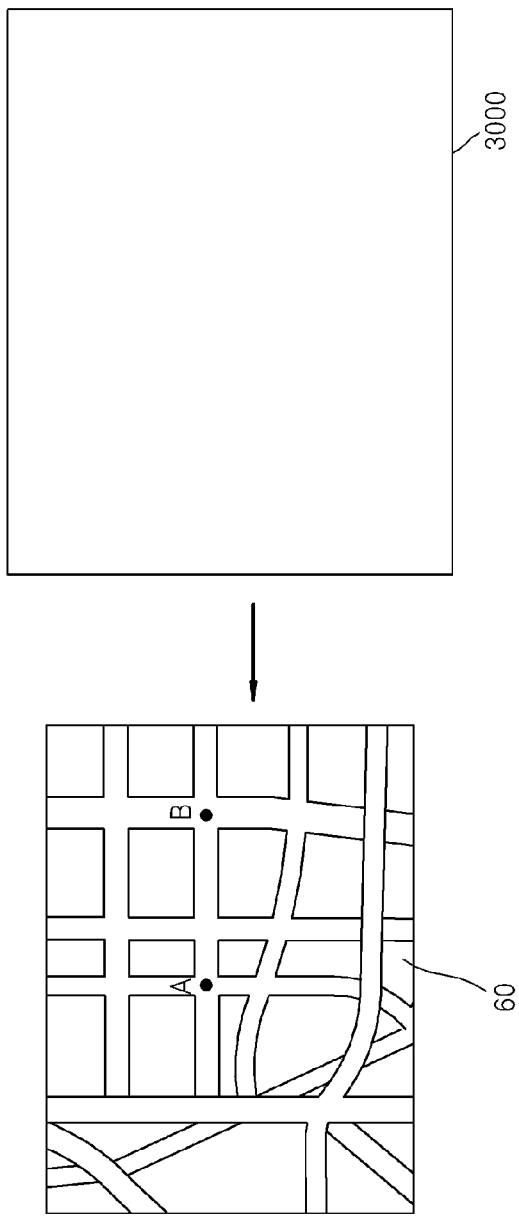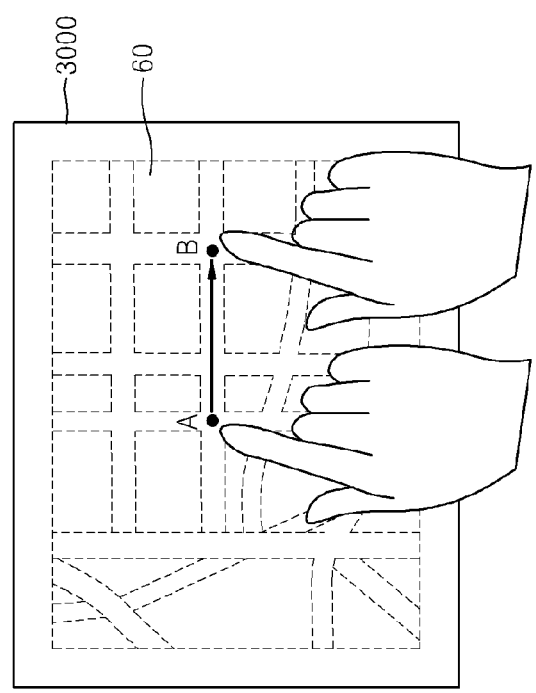
FIG. 16A
FIG. 16B

METHOD AND APPARATUS FOR GENERATING SHAPE INFORMATION OF OBJECT

CROSS-REFERENCE TO RELATED PATENT APPLICATION

This application claims priority from Korean Patent Application No. 10-2012-0095956, filed on Aug. 30, 2012, in the Korean Intellectual Property Office, the disclosure of which is incorporated herein in its entirety by reference.

BACKGROUND

1. Field

Exemplary embodiments relate to a method and an apparatus for generating shape information of an object using a flexible display apparatus that surrounds the object.

2. Description of the Related Art

In the related art, a variety of research is being conducted on technologies for measuring a shape of an object. These technologies include both contact measurement methods and non-contact measurement methods. These technologies may be applied to various fields outside of engineering.

However, when using a related art shape measurement technology, the shape of an object is measured using a camera to photograph the object, or reflected light from the object. Further, complex apparatuses must be used to identify and measure the shape of an object. Furthermore, it is difficult for a user to use a portable device to effectively measure the shape of an object.

Therefore, a technology is necessary which effectively generates shape information of an object and measures the object.

SUMMARY

Exemplary embodiments relate to a method and an apparatus for generating shape information of an object by identifying a bend in a flexible display apparatus surrounding an object.

Exemplary embodiments also relate to a method and an apparatus for generating shape information of the object based on a portion of the flexible display apparatus that contacts the object.

Exemplary embodiments also relate to a method and an apparatus for generating shape information and measuring the object based on a touch input by a user on the flexible display apparatus surrounding the object.

According to a first aspect of exemplary embodiments, there is provided a method, performed by a device, of generating shape information of an object, the method including identifying a bend location of a flexible display apparatus surrounding the object; identifying a bend angle of the flexible display apparatus; and generating the shape information of the object based on the bend location of the flexible display apparatus and the bend angle of the flexible display apparatus.

The method further includes identifying a bend direction of the flexible display apparatus, wherein the generating the shape information includes generating the shape information based on the bend location, the bend angle, and the bend direction.

The shape information regarding at least one of the bend location, the bend angle, and the bend direction is provided to the device from the flexible display apparatus.

The method further includes identifying a portion of the flexible display apparatus that contacts the object, wherein the generating the shape information includes generating the shape information based on a location of the contact portion.

The method further includes displaying guiding information for surrounding the object with the flexible display apparatus, wherein the flexible display apparatus surrounds the object in response to the flexible display apparatus being pressed based on the guiding information.

The method further includes displaying an image of the object on the flexible display apparatus based on the shape information.

The image of the object includes at least one of a 2-dimensional (2D) image and a 3-dimensional (3D) image.

The image of the object includes a folded out view of the object.

The method further includes displaying a user interface on the flexible display apparatus for measuring a shape of the object surrounded by the flexible display apparatus.

The method further includes measuring the object based on a user input which is input via the user interface.

The user input includes a touch input on the flexible display apparatus which surrounds the object, wherein the touch input includes at least one of touching a plurality of points on the flexible display apparatus, and touching and dragging a point on the flexible display apparatus.

The user input includes an input which selects a predetermined portion of the object, wherein the measuring of the object includes measuring at least one of a length, an area size, a volume and an angle of the predetermined portion.

According to a second aspect of exemplary embodiments, there is provided a device for generating shape information of an object, the device including a bend identifier for identifying a bend location and a bend angle of a flexible display apparatus surrounding the object; and a shape information generator for generating the shape information of the object based on the bend location of the flexible display apparatus and the bend angle of the flexible display apparatus.

The bend identifier identifies a bend direction of the flexible display apparatus, wherein the shape information generator generates the shape information based on the bend location, the bend angle, and the bend direction.

The shape information regarding at least one of the bend location, the bend angle, and the bend direction is provided to the device from the flexible display apparatus.

The device further includes a contact identifier identifying a portion of the flexible display apparatus that contacts the object, wherein the shape information generator generates the shape information based on a location of the contact portion.

The device further includes a displayer for displaying guiding information for surrounding the object on the flexible display apparatus, wherein the flexible display apparatus surrounds the object in response to the flexible display apparatus being pressed based on the guiding information.

The device further includes a displayer for displaying an image of the object on the flexible display apparatus based on the shape information.

The image of the object includes at least one of a 2D image and a 3D image.

The image of the object includes a folded out view of the object.

The device further includes a displayer for displaying a user interface on the flexible display apparatus for measuring a shape of the object surrounded by the flexible display apparatus.

The device further includes measuring the object based on a user input which is input via the user interface.

The user input includes a touch input on the flexible display apparatus which surrounds the object, wherein the touch input includes at least one of touching a plurality of points on the flexible display apparatus, and touching and dragging a point on the flexible display apparatus.

The user input includes an input which selects a predetermined portion of the object, wherein the measuring the object includes measuring at least one of a length, an area size, a volume and an angle of the predetermined portion.

According to a third aspect of exemplary embodiments, there is provided a non-transitory computer-readable recording medium having recorded thereon a program, which when executed by a computer, performs the method of the first aspect.

According to a fourth aspect of exemplary embodiments, there is provided a method of a device for generating shape information of an object, the method including identifying a bend of a flexible apparatus; identifying a contact portion of the display apparatus; generating the shape information of the object based on the bend of the flexible apparatus; and displaying an image of the object on the flexible display apparatus based on the generated shape information.

BRIEF DESCRIPTION OF THE DRAWINGS

The above and other features and advantages of the exemplary embodiments will become more apparent by describing in detail exemplary embodiments thereof with reference to the attached drawings in which:

FIGS. 16A and 16B illustrate an example in which a distance between predetermined points on a map is measured by using the flexible display apparatus laid out flat on the map, according to an embodiment;

DETAILED DESCRIPTION OF EXEMPLARY EMBODIMENTS

Figure 1:
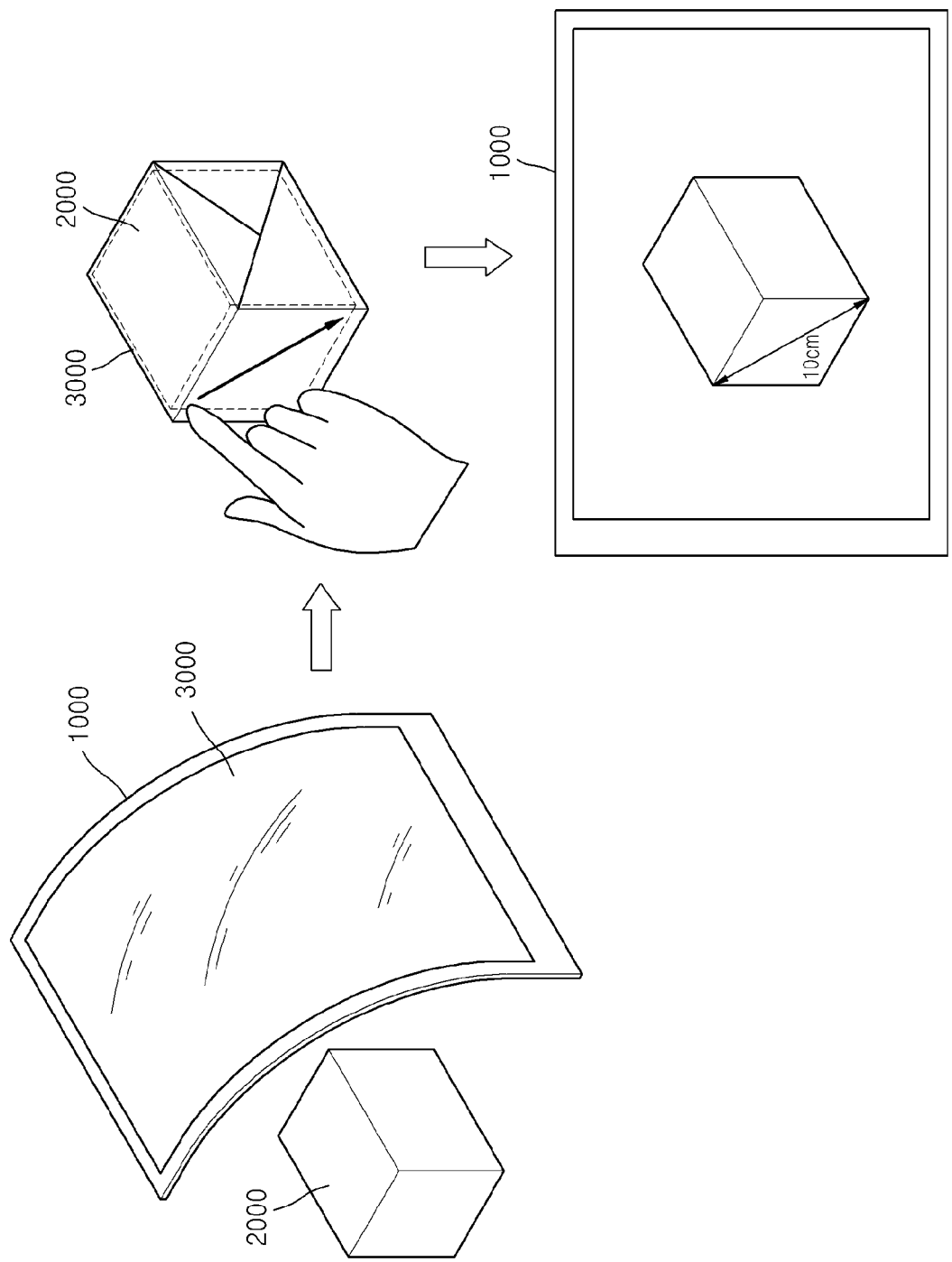
FIG. 1 is a schematic view illustrating a method of a device using a flexible display apparatus to generate shape information of an object and measure the object, according to an embodiment.

Hereinafter, exemplary embodiments will now be described more fully with reference to the accompanying drawings, in which exemplary embodiments are shown. Exemplary embodiments may, however, be embodied in many different forms and should not be construed as being limited to the embodiments set forth herein. These embodiments are provided so that this disclosure will be thorough and complete, and will fully convey the concept of exemplary embodiments to those of ordinary skill in the art. In the following description, well-known functions or constructions are not described in detail, so as not to obscure exemplary embodiments with unnecessary detail. Also, throughout the specification, like reference numerals in the drawings denote like elements.

Throughout the specification, it will also be understood that when an element is referred to as being "connected to" another element, it can be directly connected to the other element, or electrically connected to the other element while intervening elements may be present. Also, when a part "includes" or "comprises" an element, unless there is a particular description contrary thereto, the part can further include other elements.

In the present specification, a device generates shape information of an object using a twistable and bendable flexible display apparatus, for example, a foldable, bendable, and rollable display apparatus.

In addition, in the present specification, bending a flexible display apparatus refers to modifying a shape of the display apparatus. For example, bending the flexible display apparatus may refer to folding or rolling the flexible display apparatus.

As used herein, expressions such as "at least one of," when preceding a list of elements, modify the entire list of elements, and do not modify the individual elements of the list.

FIG. 1 is a schematic view illustrating a method of a device 1000 using a flexible display apparatus 3000 to generate shape information of an object 2000 and measure the object 2000, according to an embodiment. In FIG. 1, the device 1000 may include the flexible display apparatus 3000.

As illustrated in FIG. 1, a user may fold the flexible display apparatus 3000 of the device 1000 to surround the predetermined object 2000. The device 1000 may identify a bent portion and a contact portion of the flexible display apparatus 3000, and generate the shape information of the object 2000.

Also, if the user performs a touch and drag operation on at least one point of the flexible display apparatus 3000 via a predetermined user interface displayed on the flexible display apparatus 3000, the device 1000 may measure the object 2000 based on a touch input by the user.

Also, based on the generated shape information, the device 1000 may display an image of the object 2000 on the flexible display apparatus 3000. The device may display a measurement value of a predetermined portion of the object 2000 and the image of the object 2000.

Figure 2:
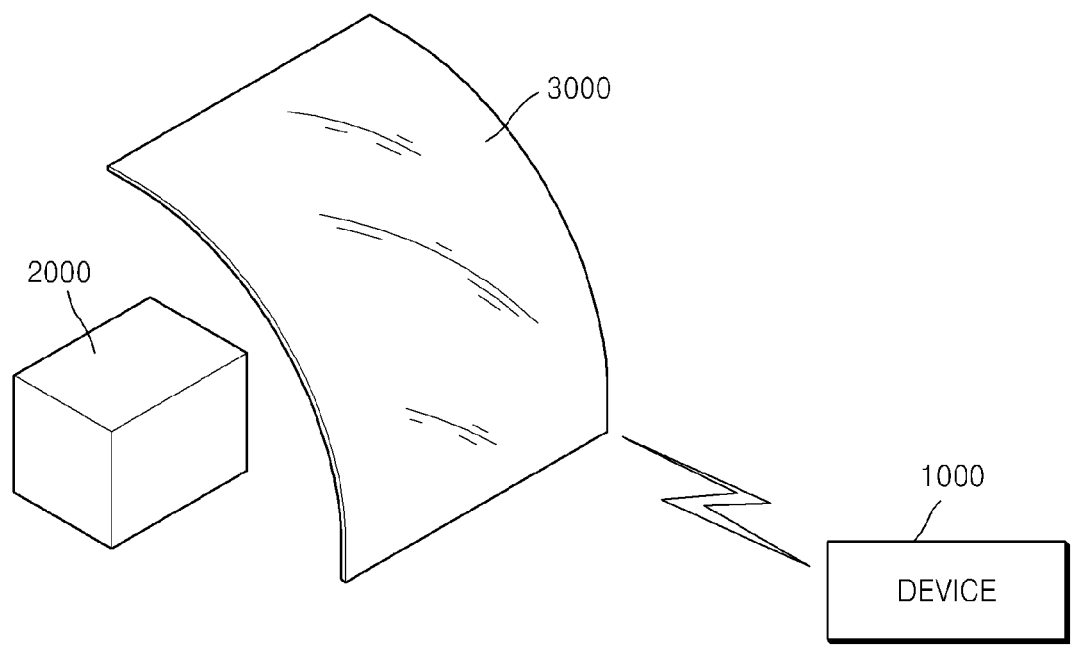
FIG. 2 is a schematic view illustrating a method of a device using a flexible display apparatus to generate shape information of an object and measure the object, according to another embodiment.

FIG. 2 is a schematic view illustrating a method of a device 1000 using a flexible display apparatus 3000 to generate shape information of an object 2000 and measure the object 2000, according to another embodiment. Referring to FIG. 2, the device 1000 and the flexible display apparatus 3000 may be separated from each other. The device 1000 may generate shape information of the object 2000 and transmit and receive various information for measuring the object 2000 by performing wired and/or wireless communication with the flexible display apparatus 3000. In this case, the flexible display apparatus 3000 may include a plurality of sensors to sense the bent portion and the contact portion of the flexible display apparatus 3000, and may transmit and receive a value obtained by the sensors to and from the device 1000.

Figure 3:
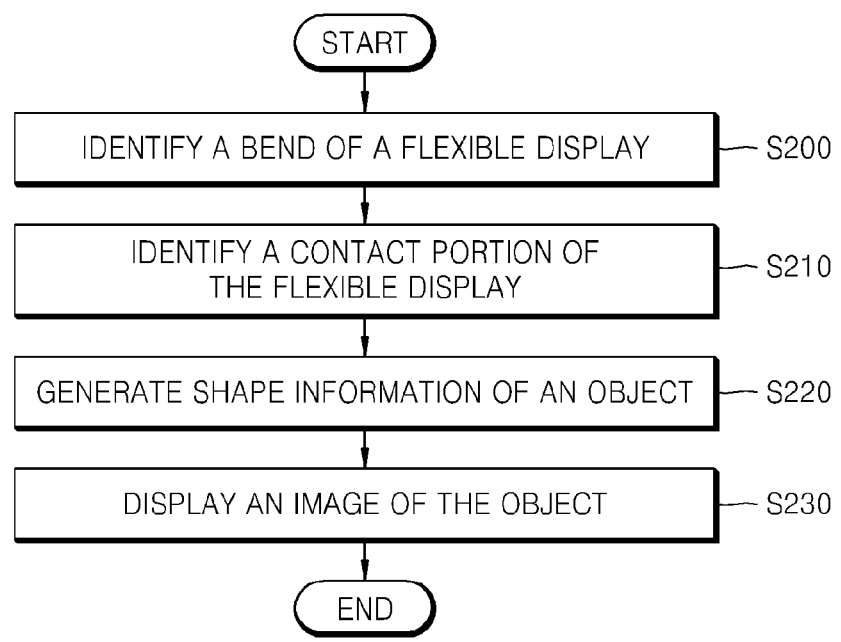
FIG. 3 is a flowchart illustrating a method of the device using the flexible display apparatus to generate the shape information of the object, according to an embodiment.

FIG. 3 is a flowchart illustrating a method of the device 1000, using the flexible display apparatus 3000 to generate the shape information of the object 2000, according to an embodiment.

In operation S200, the device 1000 identifies a bend of the flexible display apparatus 3000 surrounding the object 2000. The device 1000 may use the sensors to identify the bend of the flexible display apparatus 3000. The sensors may be piezoelectric sensors or bending sensors, but are not limited. Also, the plurality of sensors may be evenly disposed on a surface of the flexible display apparatus 3000.

In addition, the device 1000 may identify a bending location, a bending direction, and a bending angle of the flexible display apparatus 3000 using the sensors.

The bending location may be a location of the piezoelectric sensors that sense pressure or a location of the bending sensors that sense a bend. The locations of the piezoelectric sensors and bending sensors may be displayed using coordinate values on the flexible display apparatus 3000. Also, the bending direction may include directions toward the front and back of the flexible display apparatus 3000. In addition, when the flexible display apparatus 3000 is folded, the bending angle may be an angle formed by both sides of the flexible display apparatus 3000 based on the bent portion of the flexible display apparatus 3000. For example, when the flexible display apparatus 3000 is not bent, the bending angle may be 0°. On the other hand, when the flexible display apparatus 300 is bent toward the front, the bending angle may range from about 0° to about 180°. Also, when the flexible display apparatus 3000 is bent toward the back, the bending angle may range from about 0° to about 180°.

In addition, when the flexible display apparatus 3000 is completely bent toward the front, the bending angle may be 0°. When the flexible display apparatus 3000 is not bent, the bent angle may be 180°. When the flexible display apparatus 3000 is completely bent toward the back, the bent angle may be 360°.

When the flexible display apparatus 3000 is bent, the bending angle may include a curvature value of the bent portion of the flexible display apparatus 3000.

In operation S210, the device 1000 identifies a portion of the flexible display apparatus 3000 surrounding the object 2000 which contacts the object 2000 or another portion of the flexible display apparatus 3000. The device 1000 may identify a portion of the flexible display apparatus 3000 that contacts the object 2000, and a portion of the flexible display apparatus 3000 that contacts the another portion of flexible display apparatus 3000.

A predetermined current may flow at the surface of the flexible display apparatus 3000. When the portion of the flexible display apparatus 3000 contacts another portion of the flexible display apparatus 3000, the sensors detect the current that is flowing on the surface of the flexible display apparatus 3000. Then, the device 1000 may determine whether the portion of the flexible display 3000 is contacting the object 2000 or the another portion of the flexible display apparatus 3000. For example, based on the amount of current flowing at the surface of the flexible display apparatus 3000, the device 1000 may determine whether the portion of the flexible display apparatus 3000 is contacting the object 2000 or the another portion of the flexible display apparatus 3000. However, exemplary embodiments are not limited thereto.

Based on the contact portion of the flexible display apparatus 3000, the device 1000 may display guiding information for guiding bending, on the flexible display apparatus 3000. For example, the device 1000 may identify the portion of the flexible display apparatus 3000 that contacts the object 2000, and mark edges of the contact portion using a dotted line. Also, the device 1000 may display arrows on the flexible display apparatus 3000 to indicate to the user which portion should be pressed and toward which direction of the flexible display apparatus 3000 the pressing should be applied so that the flexible display apparatus 3000 surrounds the object 2000.

In operation S220, the device 1000 generates the shape information of the object 2000. Based on information regarding the bending location, the bending angle, the bending direction, and the contact portion of the flexible display apparatus 3000, the device 1000 may generate the shape information of the object 2000.

The device 1000 may determine whether the contact portion of the flexible display apparatus 3000 is a portion related to the shape of the object 2000. The device 1000 may determine the portion of the flexible display apparatus 3000 that contacts the object 2000 as a portion related to the shape of the object 2000. Also, the device 1000 may determine the portion of the flexible display apparatus 3000 that contacts the another portion of the flexible display apparatus 3000. The another portion of the flexible display apparatus 3000 is a portion unrelated to the shape of the object 2000. Furthermore, when a portion of the flexible display device 3000 contacts the object 2000 and the another portion thereof contacts the flexible display apparatus 3000, the device 1000 may determine the portion described above as the portion related to the shape of the object 2000.

Based on the bending angle of the flexible display apparatus 3000, the device 1000 may determine whether a portion of the flexible display apparatus 3000 is related to the shape of the object 2000. For example, when the flexible display apparatus 3000 is bent at a predetermined angle (for example, about 0° to about 5°), the device 1000 may determine a portion that is extended from the bent portion, but does not contact the object 2000, as the portion unrelated to the shape of the object 2000.

Based on the portion of the flexible display apparatus 3000 related to the shape of the object 2000, and the bending location, bending angle, and bending direction of the flexible display apparatus 3000, the device 1000 may generate the shape information of the object 2000.

The shape information may be used to provide the guiding information so that the device 1000 or the user may again bend and modify the flexible display apparatus 3000 into the shape of the object 2000.

In operation S230, the device 1000 displays the image of the object 2000 on the flexible display apparatus 3000. Based on the generated shape information, the device 1000 may display the image of the object 2000 on the flexible display apparatus 3000. After generating the shape information of the object 2000, when the bent flexible display apparatus 3000 is laid out flat, the device 1000 may display the image of the object 2000 on the flexible display apparatus 3000.

The device 1000 may display at least one of a 2-dimensional (2D) image and a 3-dimensional (3D) image. Also, the device 1000 may display a folded out view of the object 2000.

Figure 4:
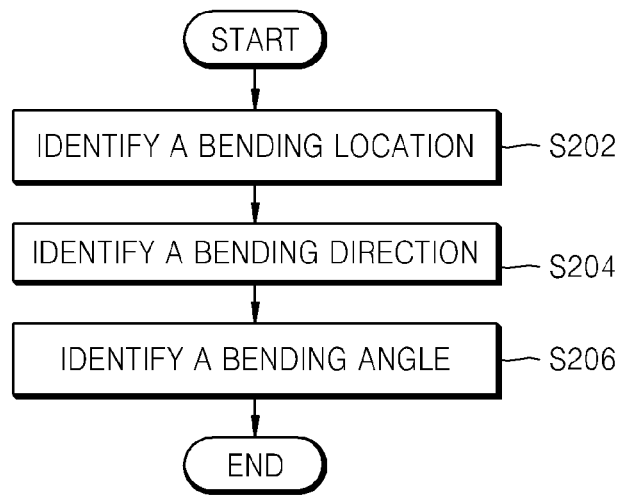
FIG. 4 is a flowchart illustrating a method, performed by the device, of identifying a bend of the flexible display apparatus, according to an embodiment.

FIG. 4 is a flowchart illustrating a method, performed by the device 1000, of identifying a bend of the flexible display apparatus 3000, according to an embodiment.

In operation S202, the device 1000 identifies the bending location of the flexible display apparatus 3000. The plurality of sensors may be disposed on the surface of the flexible display apparatus 3000 at predetermined intervals. The device 1000 may identify coordinate values of the sensors disposed on the bent portion of the flexible display apparatus 3000. The sensors may be piezoelectric sensors or other kinds of bending sensors, but are not limited.

In operation S204, the device identifies the bending direction of the flexible display apparatus 3000. The bending direction of the flexible display apparatus 3000 may include a direction toward the front surface of the flexible display apparatus 3000, and a direction toward the back surface of the flexible display apparatus 3000.

In operation S206, the device 1000 identifies the bending angle of the flexible display apparatus 3000. Based on values sensed by the sensors disposed on the bent portion of the flexible display apparatus 3000, the device 1000 may identify the bending angle of the flexible display apparatus 3000. When the flexible display apparatus 3000 is folded, the bending angle may be an angle formed by both sides of the flexible display apparatus 3000, based on the bent portion of the flexible display apparatus 3000. When the flexible display apparatus 3000 is bent, the bending angle may include a curvature value of the bent portion of the flexible display apparatus 3000.

Figure 5:
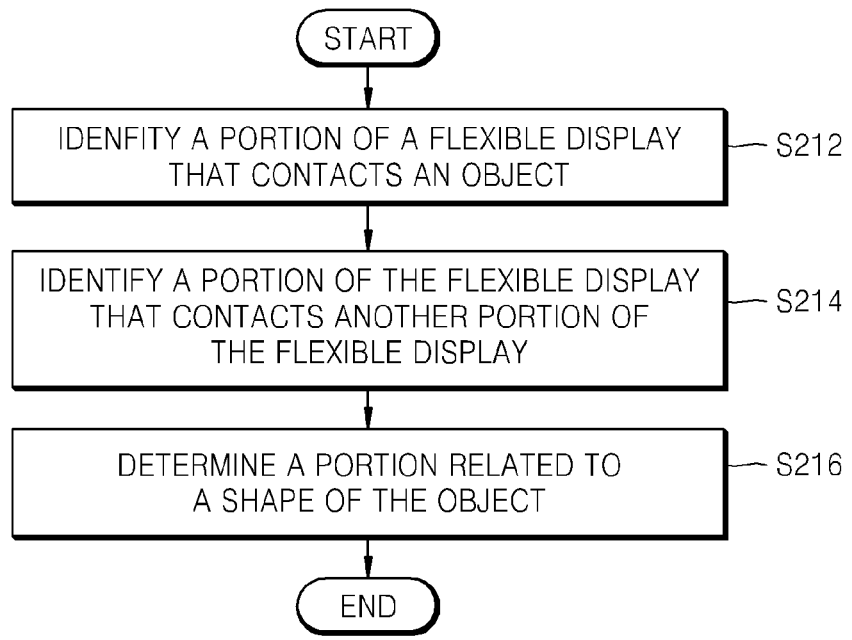
FIG. 5 is a flowchart illustrating a method, performed by the device, of identifying whether a contact portion of the flexible display apparatus is related to a shape of the object, according to an embodiment.

FIG. 5 is a flowchart illustrating a method, performed by the device 1000, of identifying whether a contact portion of the flexible display apparatus 3000 is related to the shape of the object 2000, according to an embodiment.

In operation S212, the device 1000 identifies a portion of the flexible display apparatus 3000 that contacts the object 2000. The device 1000 may use sensors, such as proximity sensors or touch sensors, to identify the portion of the flexible display apparatus 3000 that contacts the object 2000. The sensors, such as the proximity sensors or the touch sensors, may be included in the flexible display apparatus 3000. Furthermore, the device 1000 may use the sensors to identify the portion of the flexible display apparatus 3000 and to determine whether it area contacts, line contacts, or point contacts the object 2000.

In operation S214, the device 1000 identifies the flexible display apparatus 3000 that contacts the flexible display apparatus 3000. The device 1000 may use sensors, such as proximity sensors or touch sensors, to identify the portion of the flexible display apparatus 3000 that contacts another portion of the flexible display apparatus 3000. A predetermined current may flow at the surface of the flexible display apparatus 3000. When the portion of the flexible display apparatus 3000 contacts the another portion of the flexible display apparatus 3000, the sensors detect the current that is flowing at the surface of the flexible display apparatus 3000. Then, the device 1000 may determine whether the portion of the flexible display 3000 is contacting the object 2000 or the another portion of the flexible display apparatus 3000. Also, the device 1000 may distinguish the portion of the flexible display apparatus 3000 that contacts the object 2000 from the portion thereof that contacts the another portion of the flexible display apparatus 3000.

In operation S216, the device 1000 determines a portion of the flexible display apparatus 3000 that is related to the shape of the object 2000. The device 1000 may determine the portion of the flexible display apparatus 3000 that contacts the object 2000 as a portion related to the shape of the object 2000. Also, the device 1000 may determine the portion of the flexible display apparatus 3000 that contacts the another portion of the flexible display apparatus 3000. The another portion of the flexible display apparatus 300 is a portion unrelated to the shape of the object 2000. Furthermore, when a portion of the flexible display device 3000 contacts the object 2000 and another portion thereof contacts the portion of the flexible display apparatus 3000, the device 1000 may determine the portion described above as the portion related to the shape of the object 2000.

Based on the bending angle of the flexible display apparatus 3000, the device 1000 may determine whether a portion of the flexible display apparatus 3000 is related to the shape of the object 2000. For example, when the flexible display apparatus 3000 is bent at a predetermined angle (for example, about 0° to about 5°), the device 1000 may determine a portion that is extended from the bent portion, but does not contact the object 2000, as the portion unrelated to the shape of the object 2000.

Figure 6:
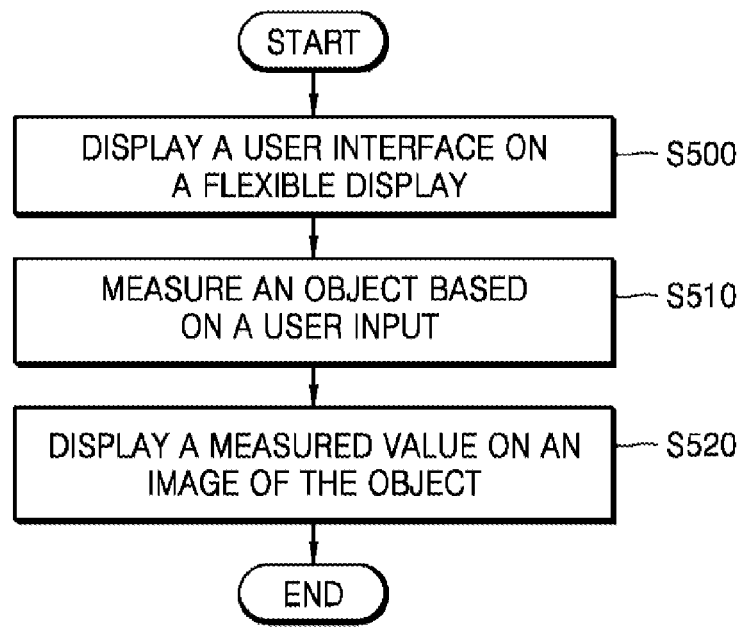
FIG. 6 is a flowchart illustrating a method, performed by the device, of measuring the object by using the flexible display apparatus, according to an embodiment.

FIG. 6 is a flowchart illustrating a method, performed by the device 1000, of measuring the object 2000 using the flexible display apparatus 3000, according to an embodiment.

In operation S500, the device 1000 displays the user interface on the flexible display apparatus 3000. When the flexible display apparatus 3000 surrounds the object 2000, the device 1000 may display the user interface for measuring the object 2000, on the flexible display apparatus 3000. To allow the user to measure the object 2000 using the touch input, the guiding information may be displayed on the user interface for measuring the object 2000.

In operation S510, the device 1000 measures the object 2000 based on a user input. The device 1000 may measure a distance between a predetermined location and another location of the object 2000. For example, if the user touches two points of the flexible display apparatus 3000 surrounding the object 2000, the device 1000 may measure a distance between the two touch points. Also, if the user performs a touch and drag operation from a predetermined point of the flexible display apparatus 3000 surrounding the object 2000 to another point, the device 1000 may measure a length of a line equivalent to the dragging by the user.

In addition, the device 1000 may measure a size of a predetermined area of the object 2000. For example, if the user touches three or more points of the flexible display apparatus 3000 surrounding the object 2000, the device 1000 may measure a size of an area that is formed by connecting the three or more touch points. Furthermore, if the user performs a touch and drag operation from a predetermined point of the flexible display apparatus 3000 surrounding the object 2000 to another point and forms a predetermined area, the device 1000 may measure a size of the area equivalent to the dragging by the user.

The device 1000 may also measure a volume of the object 2000. For example, if the user touches a predetermined point of the flexible display apparatus 3000 surrounding the object 2000, and performs a dragging motion along surfaces of the object 2000 to form a predetermined area, the device 1000 may measure a volume of the portion corresponding to the area equivalent to the dragging by the user.

However, exemplary embodiments are not limited to the method described above. Based on various user inputs to the flexible display apparatus 3000 surrounding the object 2000, the device 1000 may measure a length, a size, and a volume of a predetermined portion of the object 2000.

In operation S520, the device 1000 displays the measured value on the image of the object 2000. While laying out flat the flexible display apparatus 3000 surrounding the object 2000, the device 1000 may display the image of the object 2000 on the flexible display apparatus 3000. Thus, the device 1000 may display a measured value of a predetermined portion of the object 2000 and the image of the object 2000.

Figure 7:
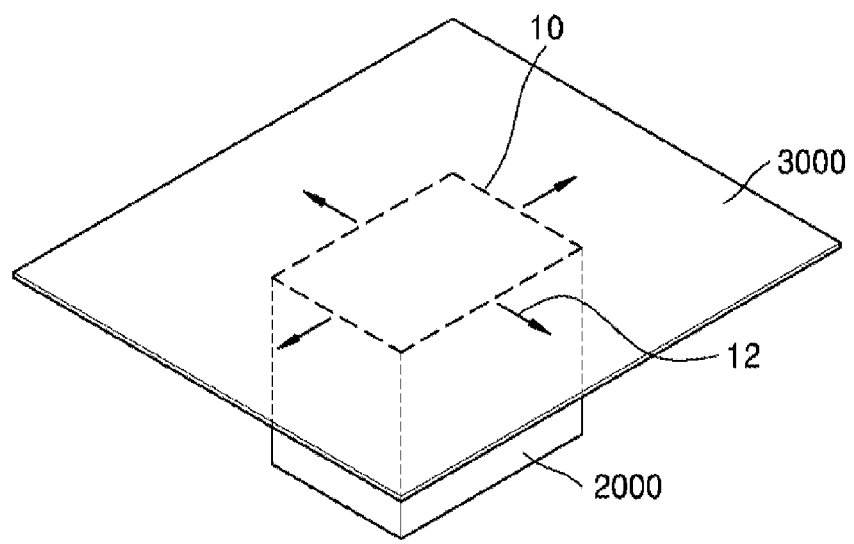
FIG. 7 illustrates an example in which the device displays information for guiding bending, on the flexible display apparatus, according to an embodiment.

FIG. 7 illustrates an example in which the device 1000 displays information for guiding the bending, on the flexible display apparatus 3000, according to an embodiment.

Referring to FIG. 7, the object 2000 is a cube. When the flexible display apparatus 3000 contacts a surface of the object 2000 to surround the object 2000, a foldable portion 10 of the flexible display apparatus 3000, which has the contact portion as a base, may be displayed on the flexible display apparatus 3000. Also, arrows 12 may be displayed on a portion that needs to be pressed to make the flexible display apparatus 3000 surround the object 2000. The arrows 12 may be displayed to point from a dotted line 10 that is displayed on the flexible display apparatus 3000, toward an opposite direction of the contact portion.

Therefore, the user may refer to the dotted line 10 and the arrows 12 displayed on the flexible display apparatus 3000. Thus, the user may bend the flexible display apparatus 3000 to effectively surround the object 2000.

Figure 8:
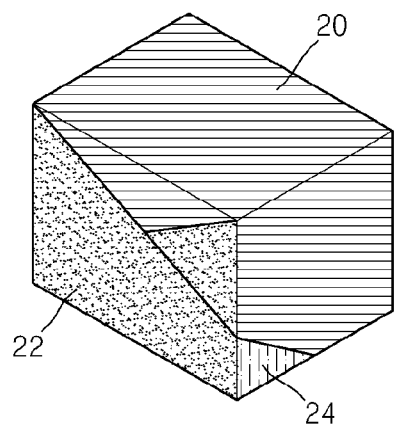
FIG. 8 illustrates an example in which a portion of the flexible display apparatus surrounding the object contacts the object and another portion of the flexible display apparatus, according to an embodiment.

FIG. 8 illustrates an example of a portion of the flexible display apparatus 3000 surrounding the object 2000 that contacts the object 2000 and another portion of the flexible display apparatus 3000, according to an embodiment.

Referring to FIG. 8, the flexible display apparatus 3000 may surround the object 2000, which is a cube. The flexible display apparatus 3000 may include a portion 20 that only contacts the object 2000, a portion 22 that contacts both the object 2000 and another portion of the flexible display apparatus 3000, and a portion 24 that only contacts another portion of the flexible display apparatus 3000. Although not shown in FIG. 8, the flexible display apparatus 3000 may further include a portion that contacts neither the object 2000 nor another portion of the flexible display apparatus 3000.

Figure 9A:
FIGS. 9A and 9B illustrate an example in which the device determines whether a contact portion of the flexible display apparatus is related to the shape of the object, according to an embodiment.
Figure 9B:
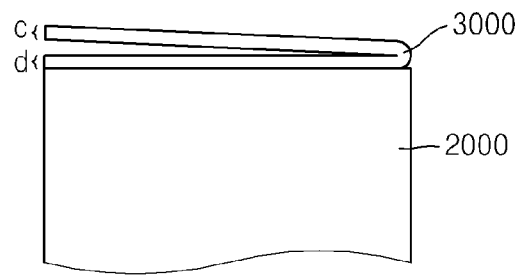

FIGS. 9A and 9B illustrate an example in which the device 1000 determines whether a contact portion of the flexible display apparatus 3000 is related to the shape of the object 2000, according to an embodiment.

As illustrated in FIG. 9A, the folded flexible display apparatus 3000 may contact the object 2000, and an "a" portion and a "b" portion of the folded flexible display apparatus 3000 may contact each other. In this regard, the device 1000 determines the b portion which contacts both the object 2000 and another portion of the flexible display apparatus 3000 as a portion related to the shape of the object 2000, and the a portion which only contacts another portion of the flexible display apparatus 3000 as a portion unrelated to the shape of the object 2000. The device 1000 may use the b portion, which is determined as the portion related to the shape of the object 2000, to generate the shape information of the object 2000.

As illustrated in FIG. 9B, the folded flexible display apparatus 3000 may contact the object 2000, and a "c" portion and a "d" portion of the folded flexible display apparatus 3000 may not contact each other. In this case, the device 1000 determines the d portion that only contacts the object 2000 as the portion related to the shape of the object 2000, and the c portion that contacts neither the object 2000 nor another portion of the flexible display apparatus 3000 as the portion unrelated to the shape of the object 2000. The device 1000 may use the d portion, which is determined as the portion related to the shape of the object 2000, to generate the shape information of the object 2000.

FIGS. 10 through 13 illustrate examples in which the user input for measuring the object 2000 is received using the flexible display apparatus 3000 surrounding the object 2000, according to an embodiment.

Figure 10:
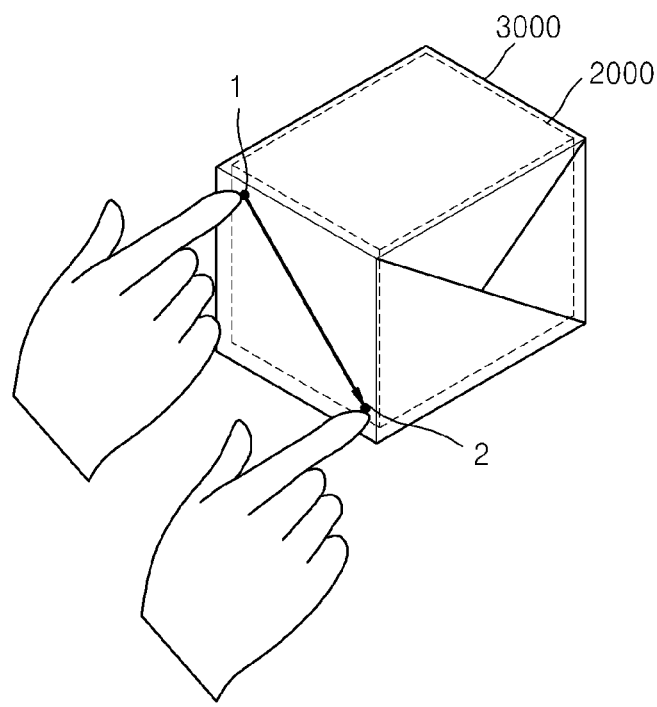
FIGS. 10 through 13 illustrate examples in which user inputs for measuring the object are received using the flexible display apparatus surrounding the object, according to an embodiment.

Referring to FIG. 10, the user touches a point 1 of the flexible display apparatus 3000 surrounding the object 2000, and performs a dragging motion to another point 2. Then, the device 1000 may measure a distance between the two points 1 and 2.

Figure 11:
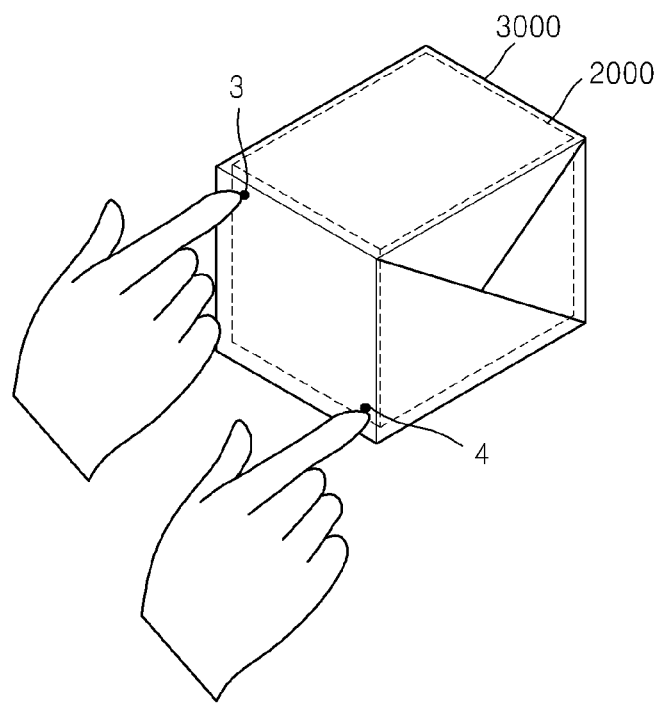

Referring to FIG. 11, the user touches two points 3 and 4 of the flexible display apparatus 3000 surrounding the object 2000. Then, the device 1000 may measure a distance between the two points 3 and 4.

Figure 12:
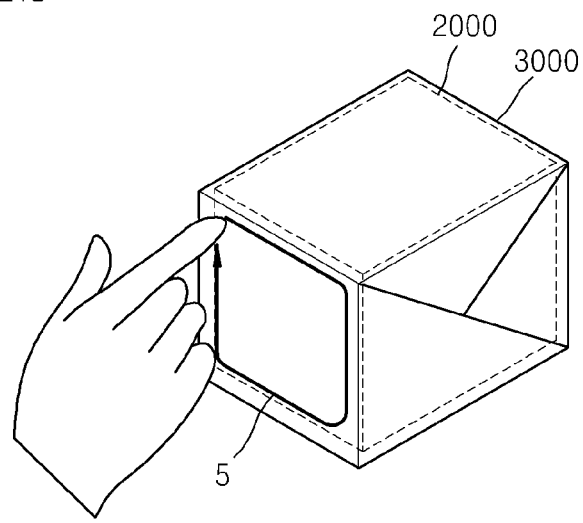

Referring to FIG. 12, the user touches the flexible display apparatus 3000 surrounding the object 2000 and performs a dragging motion to form an area 5. Then, the device 1000 may measure a size of the area 5.

Figure 13:
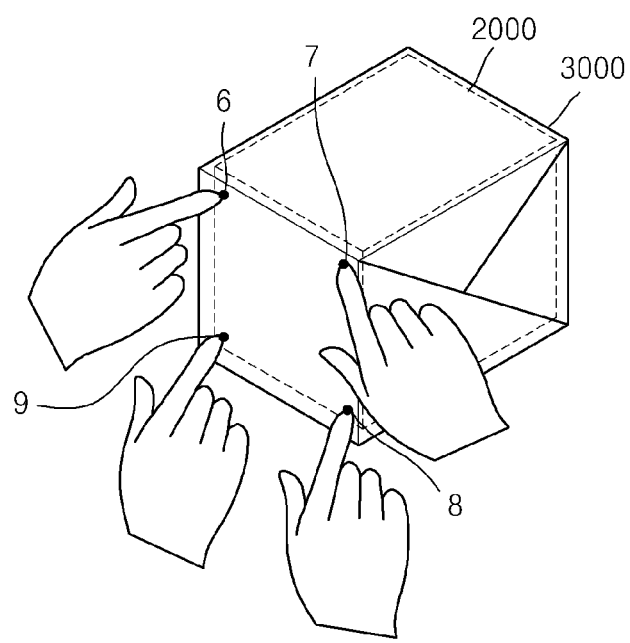

Referring to FIG. 13, the user touches four points 6, 7, 8, and 9. Then, the device 1000 may measure a size of a quadrilateral with four points 6, 7, 8, and 9 as the vertices.

Figure 14:
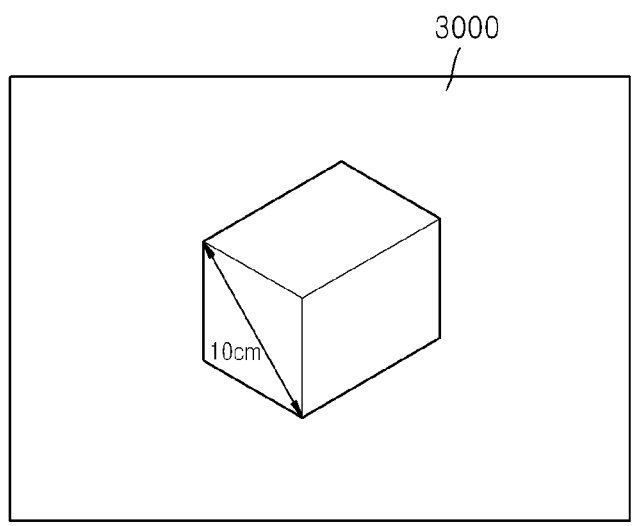
FIGS. 14 and 15 illustrate examples in which an image of the object and a measured value of the object are displayed on the flexible display apparatus, according to an embodiment.
Figure 15:
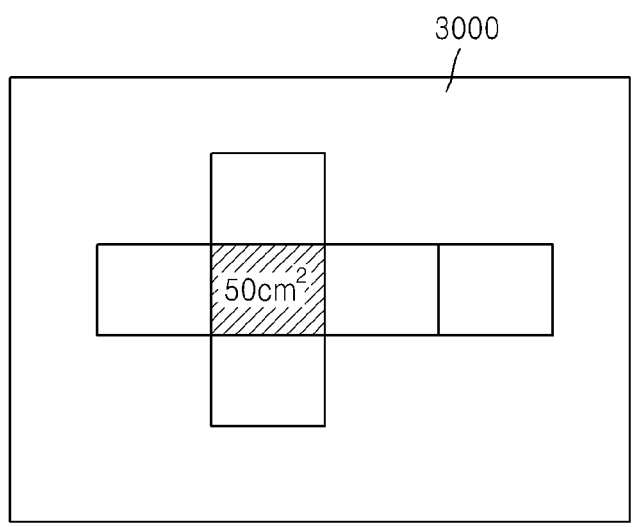

FIGS. 14 and 15 illustrate examples in which an image of the object 2000 and a measured value of the object 2000 are displayed on the flexible display apparatus 3000, according to an embodiment.

As illustrated in FIG. 14, when the flexible display apparatus 3000 surrounding the object 2000 is laid out flat, a 3-dimensional (3D) image of the object 2000 may be displayed on the flexible display apparatus 3000. Also, for example, a length of a diagonal of a surface of the object 2000 that is measured using the device 1000 may be displayed on the 3D image.

As illustrated in FIG. 15, when the flexible display apparatus 3000 surrounding the object 2000 is laid out flat, a folded out view of the object 2000 may be displayed on the flexible display apparatus 3000. Also, for example, a size of an area of the object 2000 that is measured using the device 1000 may be displayed on the folded out view.

FIGS. 16A and 16B illustrate an example in which a distance between predetermined points on a map is measured using the flexible display apparatus 3000 laid out flat on the map, according to an embodiment.

As illustrated in FIGS. 16A and 16B, the user may place the flexible display apparatus 3000 on a map 60, and perform a touch and drag operation from an "A" point to a "B" point on the flexible display apparatus 3000. Also, the device 1000 may measure a distance between the A point and the B point on the map 60. In this regard, the device 1000 may obtain the scale information of the map 60 based on a user input, or by receiving the scale information from a separate server. In addition, the device 1000 may use the length between the points A and B on the flexible display apparatus 3000, and the scale information to calculate the distance between the points A and B.

Although an example in which the flexible display apparatus 3000 is laid out flat on the map 60 is shown in FIGS. 16A and 16B, exemplary embodiments are not limited. For example, the flexible display apparatus 3000 may surround a globe (not shown), and the device 1000 may calculate a distance between the predetermined surfaces of the globe, based on a touch input by the user on the flexible display apparatus 3000.

Figure 17A:
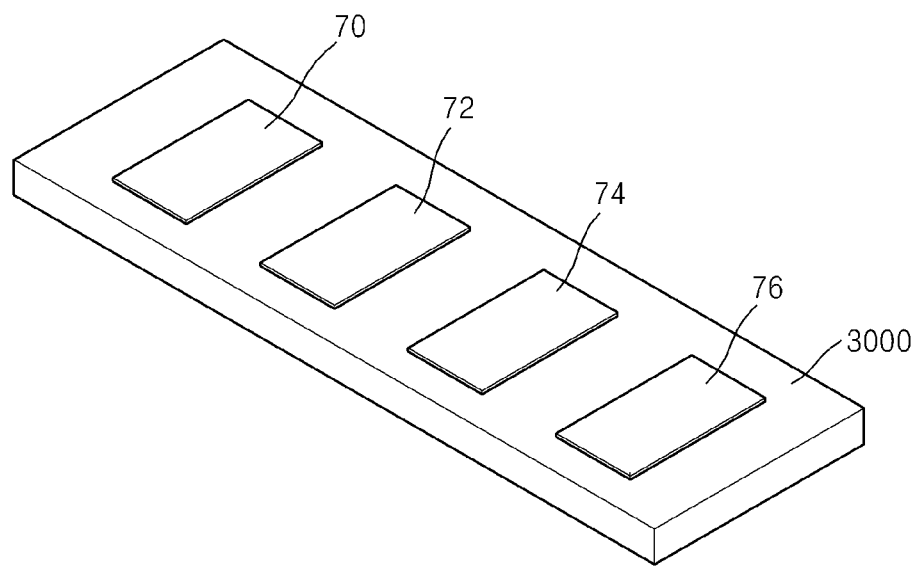
FIGS. 17A and 17B illustrate an example in which the flexible display apparatus is bent, according to an embodiment.
Figure 17B:
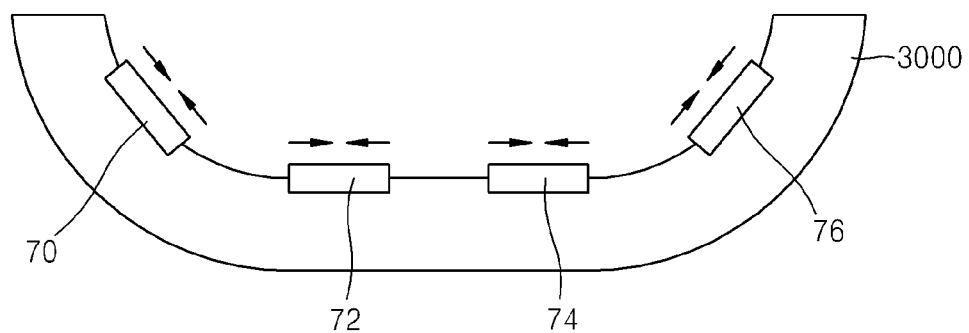

FIGS. 17A and 17B illustrate an example in which the flexible display apparatus 3000 is bent, according to an embodiment.

As illustrated in FIG. 17A, a plurality of actuators 70, 72, 74, and 76 may be disposed on the surface of the flexible display apparatus 3000, according to the present embodiment. Also, the plurality of actuators 70, 72, 74, and 76 may contract or expand, depending on a level of voltage applied to the plurality of actuators 70, 72, 74, and 76.

As illustrated in FIG. 17B, when a predetermined level of voltage is applied to the plurality of actuators 70, 72, 74, and 76, the plurality of actuators 70, 72, 74, and 76 may contract. Thus, the flexible display apparatus 3000 may be rolled.

The device 1000 may store the generated shape information. When the flexible display apparatus 3000 surrounding the object 2000 is laid out flat, the device 1000 may modify the flexible display apparatus 3000 into the shape of the object 2000 again using the shape information. Based on the shape information, the device 1000 may control the contraction and expansion of the plurality of actuators 70, 72, 74, and 76 included in the flexible display apparatus 3000. Thus, the flexible display apparatus 3000 is modified into the shape of the object 2000.

Although an example in which four actuators 70, 72, 74 and 76 are included in the flexible display apparatus 3000 is illustrated in FIGS. 17A and 17B, exemplary embodiments are not limited thereto. The flexible display apparatus 3000 may include various numbers of actuators. The device 1000 may control the modification of the actuators. Thus, the shape of the flexible display apparatus 3000 may be elaborately modified.

Figure 18:
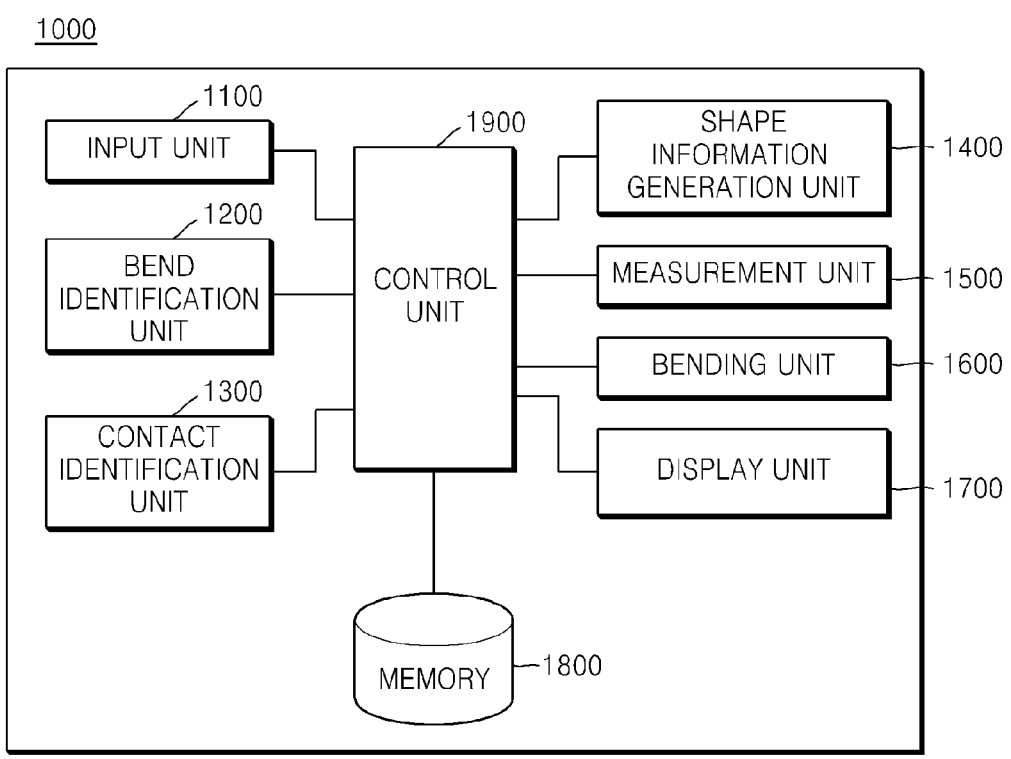
FIG. 18 is a block diagram illustrating the device, according to an embodiment.

FIG. 18 is a block diagram illustrating the device 1000, according to an embodiment.

As illustrated in FIG. 18, the device 1000, according to the present embodiment, includes an input unit 1100, a bend identification unit 1200, a contact identification unit 1300, a shape information generation unit 1400, a measurement unit 1500, a bending unit 1600, a display unit 1700, a memory 1800, and a control unit 1900. Also, the flexible display apparatus 3000 may be included inside the device 1000, or may be connected to the device 1000 from outside. The display unit 1700 may provide data to be displayed and data used for displaying, to the flexible display apparatus 3000.

The input unit 1100 receives the user input that is input via the flexible display apparatus 3000. When the user touches the surface of the flexible display apparatus 3000, the input unit 1100 may receive the information according to the touch input by the user, from the flexible display apparatus 3000. The input unit 1100 may also receive the touch input by the user for measuring the object 2000.

The bend identification unit 1200 identifies the bend of the flexible display apparatus 3000 surrounding the object 2000. The bend identification unit 1200 may use the sensors to identify the bend of the flexible display apparatus 3000. The sensors may be piezoelectric sensors or bending sensors, but are not limited thereto. Also, the plurality of sensors may be evenly disposed on the surface of the flexible display apparatus 3000.

Although the bend identification unit 1200 may be connected to the sensors and receive the information regarding the bending location, the bending direction, and the bending angle of the flexible display apparatus 3000 from the sensors, it is not limited. The bend identification unit 1200 may receive the information regarding the bending location, the bending direction, and the bending angle from the flexible display apparatus 3000, which includes the sensors.

The bending location may be a location of the piezoelectric sensors that sense pressure or a location of the bending sensors that sense a bend. The locations of the piezoelectric sensors and the bending sensors may be displayed using coordinate values on the flexible display apparatus 3000. Also, the bending direction may include front and back directions of the flexible display apparatus 3000. In addition, when the flexible display apparatus 3000 is folded, the bending angle may be an angle formed by both sides of the flexible display apparatus 3000 based on the bent portion of the flexible display apparatus 3000. When the flexible display apparatus 3000 is bent, the bending angle may include a curvature value of the bent portion of the flexible display apparatus 3000.

The contact identification unit 1300 identifies a portion of the flexible display apparatus 3000 surrounding the object 2000 that contacts the object 2000 or the another portion of the flexible display apparatus 3000. The contact identification unit 1300 may identify a portion of the flexible display apparatus 3000 that contacts the object 2000, and a portion of the flexible display apparatus 3000 that contacts the another portion of the flexible display apparatus 3000.

A predetermined current may flow at the surface of the flexible display apparatus 3000. When the portion of the flexible display apparatus 3000 contacts another portion of the flexible display apparatus 3000, the sensors, included in the flexible display apparatus 3000, may detect the current that is flowing at the surface of the flexible display apparatus 3000. Also, the contact identification unit 1300 may be connected to the sensors and receive a value of the amount of the current, which is sensed by using the sensors. However, embodiments are not limited thereto. The flexible display apparatus 3000 may receive the value of the amount of the current sensed, by the sensors, from the flexible display apparatus 3000.

Also, the contact identification unit 1300 may determine whether the portion of the flexible display 3000 is contacting the object 2000 or another portion of the flexible display apparatus 3000.

The shape information generation unit 1400 generates the shape information of the object 2000. Based on information regarding the bending location, the bending angle, the bending direction, and the contact portion of the flexible display apparatus 3000, the shape information generation unit 1400 may generate the shape information of the object 2000.

Specifically, the shape information generation unit 1400 may determine whether the contact portion of the flexible display apparatus 3000 is a portion related to the shape of the object 2000. The shape information generation unit 1400 may determine the portion of the flexible display apparatus 3000 that contacts the object 2000 as a portion related to the shape of the object 2000. Also, the shape information generation unit 1400 may determine the portion of the flexible display apparatus 3000 that contacts another portion of the flexible display apparatus 3000. The another portion of the flexible display apparatus 3000 is a portion unrelated to the shape of the object 2000. Furthermore, when a portion of the flexible display device 3000 contacts the object 2000 and the another portion thereof contacts the portion of the flexible display apparatus 3000, the shape information generation unit 1400 may determine the portion described above as the portion related to the shape of the object 2000.

Based on the bending angle of the flexible display apparatus 3000, the shape information generation unit 1400 may determine whether a portion of the flexible display apparatus 3000 is related to the shape of the object 2000. For example, when the flexible display apparatus 3000 is bent at a predetermined angle (e.g., about 0° to about 5°), the shape information generation unit 1400 may determine a portion that is extended from the bent portion, but does not contact the object 2000, as the portion unrelated to the shape of the object 2000.

Based on the portion of the flexible display apparatus 3000 related to the shape of the object 2000, and the bending location, bending angle, and bending direction of the flexible display apparatus 3000, the shape information generation unit 1400 may generate the shape information of the object 2000.

The shape information may be used to provide the guiding information so that the device 1000 or the user may again bend and modify the flexible display apparatus 3000 into the shape of the object 2000.

The measurement unit 1500 measures the object 2000 based on the user input. The measurement unit 1500 may measure a length between a predetermined location and another location of the object 2000. For example, if the user touches two points of the flexible display apparatus 3000 surrounding the object 2000, the measurement unit 1500 may measure a length between the two touch points. Also, if the user performs a touch and drag operation from a predetermined point of the flexible display apparatus 3000 surrounding the object 2000 to another point, the measurement unit 1500 may measure a length of a line equivalent to the dragging by the user.

In addition, the measurement unit 1500 may measure a size of a predetermined area of the object 2000. For example, if the user touches three or more points of the flexible display apparatus 3000 surrounding the object 2000, the measurement unit 1500 may measure a size of an area that is formed by connecting the three or more touch points. Furthermore, if the user performs a touch and drag operation from a predetermined point of the flexible display apparatus 3000 surrounding the object 2000 to another point and forms a predetermined area, the measurement unit 1500 may measure a size of an area equivalent to the dragging by the user.

The measurement unit 1500 may also measure a volume of the object 2000. For example, if the user touches a predetermined point of the flexible display apparatus 3000 surrounding the object 2000, and performs a dragging motion along surfaces of the object 2000 to form a predetermined area, the measurement unit 1500 may measure a volume of the portion corresponding to the area equivalent to the dragging by the user.

However, exemplary embodiments are not limited to the method described above. Based on various user inputs to the flexible display apparatus 3000 surrounding the object 2000, the measurement unit 1500 may measure a length, a size, and a volume of a predetermined portion of the object 2000.

The bending unit 1600 modifies the flexible display apparatus 3000. When the flexible display apparatus 3000 surrounding the object 2000 is laid out flat, the bending unit 1600 may again modify the flexible display apparatus 3000 into the shape of the object 2000 using the shape information. For example, a plurality of actuators may be disposed on the surface of the flexible display apparatus 3000. Then, based on the shape information, the bending unit 1600 may apply voltage to the predetermined actuators, and then modify the flexible display apparatus 3000. Therefore, the bending unit 1600 may provide the control information, for modifying the flexible display apparatus 3000, to the flexible display apparatus 3000.

The display unit 1700 may provide data to be displayed and data used for displaying, to the flexible display apparatus 3000. Based on the contact portion of the flexible display apparatus 3000, the display unit 1700 may provide guiding information for guiding a bend, to the flexible display apparatus 3000. For example, the display unit 1700 may identify the portion of the flexible display apparatus 3000 that contacts the object 2000, and provide information for marking edges of the contact portion using a dotted line. Also, to indicate to the user which portion of and which direction the flexible display apparatus 3000 should be pressed so that the flexible display apparatus 3000 surrounds the object 2000, the display unit 1700 may provide information for displaying arrows on the flexible display apparatus 3000.

When the flexible display apparatus 3000 surrounds the object 2000, the display unit 1700 may provide the user interface for measuring the object 2000, to the flexible display apparatus 3000. To allow the user to measure the object 2000 by using the touch input, the guiding information may be displayed on the user interface for measuring the object 2000.

The display unit 1700 may provide data regarding the image of the object 2000 to the flexible display apparatus 3000. Based on the shape information, the display unit 1700 may provide data regarding the image of the object 2000 to the flexible display apparatus 3000. After generating the shape information of the object 2000, when the bent flexible display apparatus 3000 is laid out flat, the display unit 1700 may provide data regarding the image of the object 2000 to the flexible display apparatus 3000. The display unit 1700 may provide data regarding at least one of a 2D image and a 3D image to the flexible display apparatus 3000. Also, the display unit 1700 may provide data regarding a folded out view of the object 2000 to the flexible display apparatus 3000.

In addition, the display unit 1700 may provide data regarding a measurement value of the object 2000 to the flexible display apparatus 3000. Thus, a measurement value of a predetermined portion of the object 2000 may be displayed with the image of the object 2000, on the flexible display apparatus 3000.

The memory 1800 stores various information necessary for the device 1000 to generate and display the shape information of the object 2000. The memory 1800 may store bending information, shape information, and image information. However, embodiments are not limited thereto.

The control unit 1900 controls all operations of the device 100. To allow the device 1000 to generate and display the shape information of the object 2000, the control unit 1900 controls the input unit 110, the bending identification unit 1200, the contact identification unit 1300, the shape information generation unit 1400, the measurement unit 1500, the bending unit 1600, the display unit 1700, and the memory 1800.

Some or all of the input unit 110, the bending identification unit 1200, the contact identification unit 1300, the shape information generation unit 1400, the measurement unit 1500, the bending unit 1600, and the display unit 1700 may be operated by using a software module. However, exemplary embodiments are not limited thereto. Also, some of the input unit 110, the bending identification unit 1200, the contact identification unit 1300, the shape information generation unit 1400, the measurement unit 1500, the bending unit 1600, and the display unit 1700 may be operated by using hardware.

In addition, at least some of the input unit 1100, the bending identification unit 1200, the contact identification unit 1300, the shape information generation unit 1400, the measurement unit 1500, the bending unit 1600, and the display unit 1700 may be included in the control unit 1900. The input unit 1100, the bending identification unit 1200, the contact identification unit 1300, the shape information generation unit 1400, the measurement unit 1500, the bending unit 1600, the display unit 1700, and the control unit 1900 may be operated using a processor. However, exemplary embodiments are not limited thereto.

Embodiments may be implemented in the form of a computer-executable recording medium, including commands such as a computer-executable program module. A computer-readable medium may be an arbitrary medium that may be accessed by a computer, and includes volatile and nonvolatile media, and separable and non-separable media. Also, the computer-readable medium may include a computer recording medium and a communication medium. The computer recording medium includes volatile and nonvolatile media and separable and non-separable media that are embodied using an arbitrary method or technology for storing information, such as a computer-readable command, a data structure, a program module, or other data. The communication medium generally includes a computer-readable command, a data structure, a program module, other data of a modulated data signal, or other transmission mechanisms, and the communication medium includes an arbitrary information transmission medium.

While the exemplary embodiments have been particularly shown and described with reference to exemplary embodiments thereof, it will be understood by one of ordinary skill in the art that various changes in form and details may be made therein without departing from the spirit and scope of the present invention as defined by the following claims. The preferred embodiments should be considered in a descriptive sense only and not for purposes of limitation. Therefore, the scope of the invention is defined not by the detailed description of the exemplary embodiments but by the appended claims, and all differences within the scope will be construed as being included in the present invention.

What is claimed is:

1. A method, performed by a device, of generating shape information of an object, the method comprising:
    identifying a bend location of a flexible display apparatus surrounding the object;
    identifying a bend angle of the flexible display apparatus; and
    generating the shape information of the object based on the bend location of the flexible display apparatus and the bend angle of the flexible display apparatus.

2. The method of claim 1, further comprising:
    identifying a bend direction of the flexible display apparatus,
    wherein the generating the shape information comprises generating the shape information based on the bend location, the bend angle, and the bend direction.

3. The method of claim 2, wherein the shape information regarding at least one of the bend location, the bend angle, and the bend direction is provided to the device from the flexible display apparatus.

4. The method of claim 1, further comprising:
    identifying a portion of the flexible display apparatus that contacts the object,
    wherein the generating the shape information comprises generating the shape information based on a location of the contact portion.

5. The method of claim 1, further comprising:
    displaying guiding information for surrounding the object with the flexible display apparatus,
    wherein the flexible display apparatus surrounds the object in response to the flexible display apparatus being pressed based on the guiding information.

6. The method of claim 1, further comprising:
    displaying an image of the object on the flexible display apparatus based on the shape information.

7. The method of claim 6, wherein the image of the object comprises at least one of a 2-dimensional (2D) image and a 3-dimensional (3D) image.

8. The method of claim 6, wherein the image of the object includes a folded out view of the object.

9. The method of claim 2, further comprising:
    displaying a user interface on the flexible display apparatus for measuring a shape of the object surrounded by the flexible display apparatus.

10. The method of claim 9, further comprising measuring the object based on a user input that is input via the user interface.

11. The method of claim 10, wherein the user input comprises a touch input on the flexible display apparatus which surrounds the object,
    wherein the touch input comprises at least one of touching a plurality of points on the flexible display apparatus, and touching and dragging a point on the flexible display apparatus.

12. The method of claim 10, wherein the user input comprises an input which selects a predetermined portion of the object,
    wherein the measuring the object comprises measuring at least one of a length, an area size, a volume, and an angle of the predetermined portion.

13. A device for generating shape information of an object, the device comprising:
    a processor;
    a bend identifier configured to identify, by the processor, a bend location and a bend angle of a flexible display apparatus surrounding the object; and
    a shape information generator configured to generate the shape information of the object based on the bend location of the flexible display apparatus and the bend angle of the flexible display apparatus.

14. The device of claim 13, wherein the bend identifier identifies a bend direction of the flexible display apparatus,
    wherein the shape information generator generates the shape information based on the bend location, the bend angle, and the bend direction.

15. The device of claim 14, wherein the shape information regarding at least one of the bend location, the bend angle, and the bend direction is provided to the device from the flexible display apparatus.

16. The device of claim 13, further comprising:
    a contact identifier identifying a portion of the flexible display apparatus that contacts the object, wherein the shape information generator generates the shape information based on a location of the contact portion.

17. The device of claim 13, further comprising:
a displayer for displaying guiding information for surrounding the object on the flexible display apparatus,
wherein the flexible display apparatus surrounds the object in response to the flexible display apparatus being pressed based on the guiding information.

18. The device of claim 13, further comprising:
a displayer for displaying an image of the object on the flexible display apparatus based on the shape information.

19. The device of claim 18, wherein the image of the object comprises at least one of a 2D image and a 3D image.

20. The device of claim 18, wherein the image of the object includes a folded out view of the object.

21. The device of claim 13, further comprising:
a displayer for displaying a user interface on the flexible display apparatus for measuring a shape of the object surrounded by the flexible display apparatus.

22. The device of claim 21, further comprising:
a measurement unit configured to measure the object based on a user input which is input via the user interface.

23. The device of claim 22, wherein the user input comprises a touch input on the flexible display apparatus which surrounds the object,
wherein the touch input comprises at least one of touching a plurality of points on the flexible display apparatus, and touching and dragging a point on the flexible display apparatus.

24. The device of claim 22, wherein the user input comprises an input which selects a predetermined portion of the object,
wherein the measurement unit measures the object by measuring at least one of a length, an area size, a volume, and an angle of the predetermined portion.

25. A non-transitory computer-readable recording medium having recorded thereon a program, which when executed by a computer, performs the program comprising:
identifying a bend location of a flexible display apparatus surrounding an object;
identifying a bend angle of the flexible display apparatus; and
generating a shape information of the object based on the bend location of the flexible display apparatus and the bend angle of the flexible display apparatus.

* * * * *